(12) United States Patent
Kennedy et al.

(10) Patent No.: US 8,205,217 B2
(45) Date of Patent: Jun. 19, 2012

(54) METHODS AND SYSTEMS FOR CONFIGURING A SPECIFIC-USE COMPUTING SYSTEM LIMITED TO EXECUTING PREDETERMINED AND PRE-APPROVED APPLICATION PROGRAMS

(75) Inventors: Mark Kennedy, Redondo Beach, CA (US); Mark Obrecht, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 1298 days.

(21) Appl. No.: 11/864,957

(22) Filed: Sep. 29, 2007

(65) Prior Publication Data
US 2009/0089814 A1 Apr. 2, 2009

(51) Int. Cl.
*G06F 9/44* (2006.01)
(52) U.S. Cl. ...................................... 719/327
(58) Field of Classification Search .................. 719/327; 713/152, 164, 165, 166, 167
See application file for complete search history.

(56) References Cited

U.S. PATENT DOCUMENTS

| | | | | |
|---|---|---|---|---|
| 7,269,259 B1* | 9/2007 | Fernandez | | 380/264 |
| 7,694,296 B1* | 4/2010 | Kennedy | | 717/175 |
| 7,890,427 B1* | 2/2011 | Rao et al. | | 705/51 |
| 2004/0025033 A1* | 2/2004 | Todd | | 713/189 |
| 2004/0107368 A1* | 6/2004 | Colvin | | 713/202 |
| 2004/0117628 A1* | 6/2004 | Colvin | | 713/176 |
| 2004/0153644 A1* | 8/2004 | McCorkendale et al. | | 713/156 |
| 2006/0031830 A1* | 2/2006 | Chu et al. | | 717/174 |
| 2006/0143474 A1 | 6/2006 | Knechtel et al. | | |
| 2007/0079373 A1* | 4/2007 | Gassoway | | 726/22 |

OTHER PUBLICATIONS

Search Report and Written Opinion Received in related European Application No. EP 08165379.2.
Van Doorn, Leendert et al.; "Signed Executables for Linux;" Jun. 4, 2001; pp. 1-9; www.cs.umd.edu/{waa/pubs/cs4259.ps>.
Office Action Received in related European Application No. EP 08165379.2.

* cited by examiner

*Primary Examiner* — Van Nguyen
(74) *Attorney, Agent, or Firm* — Advantedge Law Group (57) ABSTRACT

Systems and methods for configuring a specific-use computing system are disclosed. A computing system may comprise a first set of predetermined application programs and a processor limited to executing the first set of predetermined application programs and pre-approved application programs received from a pre-approved computing device. The computing system may also include a communication interface configured to enable communication between the first computing system and the pre-approved computing device. Exemplary methods and computer-readable media are also enclosed.

17 Claims, 6 Drawing Sheets

METHODS AND SYSTEMS FOR CONFIGURING A SPECIFIC-USE COMPUTING SYSTEM LIMITED TO EXECUTING PREDETERMINED AND PRE-APPROVED APPLICATION PROGRAMS

BACKGROUND

Conventional computing systems are configured to perform a broad variety of tasks, many of which some users will never need or use. In fact, many consumers purchase a computing system to perform a limited number of tasks and leave many of the computing functions unused. Managing security on a conventional computing system is complicated by its large number of application programs, each of which adds exposure to the computing device if left unprotected. Adequately securing and protecting most computing systems requires a high degree of computer sophistication and significant involvement by the user. For those who lack a high level of computer sophistication or desire to be closely involved with their computing system's security, use of their computing system often poses a significant risk of exposure as their computing device is often left unprotected. Thus, the general purpose nature of many computing devices presents security challenges for those without sufficient computing expertise. In addition, because many computing application programs are not used, the security risks associated with these programs are unnecessary.

SUMMARY

According to at least one embodiment, a first computing system may comprise a first set of predetermined application programs, a processor limited to executing the first set of predetermined application programs and pre-approved application programs received from a pre-approved computing device, and a communication interface configured to enable communication between the first computing system and the pre-approved computing device.

In at least one embodiment, the pre-approved computing device is a plurality of computing devices. In another embodiment, the first computing system further comprises a security module that prevents the first computing system from receiving any application programs from any non-approved computing device.

In certain embodiments, the first computing system further comprises a security module that prevents the first computing system from executing any application programs from any non-approved computing device. In other embodiments, the computing system further comprises a security module configured to prevent the creation of computer-executable instructions except by consent of the security module.

In another embodiment, the first computing system is a plurality of computing systems. In yet another embodiment, the pre-approved application programs may comprise at least one of a software update, a hardware update, an application update, a registry key update, an operating system update, and a device driver update.

In another embodiment, the pre-approved computing device may manage communication between the first computing system and additional computing systems. The first computing system may further comprise a user-interface configured to facilitate communication between the first computing system and the pre-approved computing device.

In at least one embodiment, the pre-approved application programs may comprise application programs not included in the first set of predetermined application programs. In another embodiment, the pre-approved computing device is configured to further limit the processor of the first computing system to executing only a portion of the first set of predetermined application programs.

In yet another embodiment, a method for configuring the first computing system comprises identifying the first computing system, where the first computing system comprises a processor and a communication interface, predetermining a first set of computer-executable application programs, limiting the processor to executing the first set of predetermined computer-executable application programs and pre-approved computer-executable application programs received from a pre-approved computing device, and configuring the communication interface to enable communication between the first computing system and the pre-approved computing device.

In another embodiment, the pre-approved computing device is a plurality of computing devices. In at least another embodiment, a security module is configured to prevent the first computing system from receiving any application programs from any non-approved computing device. In yet another embodiment, a security module is configured to prevent the first computing system from executing any application programs from any non-approved computing device. In another embodiment, a security module is configured to prevent the creation of computer-executable instructions except by consent of the security module.

Another embodiment prevents the execution of any application programs from any computing device not pre-approved. In yet another embodiment, the first computing system is a plurality of computing systems.

In at least one embodiment, the pre-approved application programs comprise at least one of a software update, a hardware update, an application update, a registry key update, an operating system update, and a device driver update.

In another embodiment, the pre-approved computing device is configured to manage communication between the first computing system and additional computing systems. In yet another embodiment, a user-interface facilitates communication between the first computing system and the pre-approved computing device.

In at least one embodiment, the pre-approved application programs comprise application programs not included in the first set of predetermined application programs.

In some embodiments, the pre-approved computing device is configured to further limit the processor of the first computing system to execute only a portion of the first set of predetermined application programs.

In another embodiment, a computer-readable medium comprises a first computer-executable instruction operable to identify a first computing system, the first computing system comprising a processor and a communication interface, a second computer-executable instruction operable to pre-determine a first set of computer executable application programs, a third computer-executable instruction operable to limit the processor to executing the first set of predetermined computer-executable application programs and pre-approved computer-executable application programs received from a pre-approved computing device, and a fourth computer-executable instruction operable to configure a communication interface to enable communication between the first computing system and the pre-approved computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
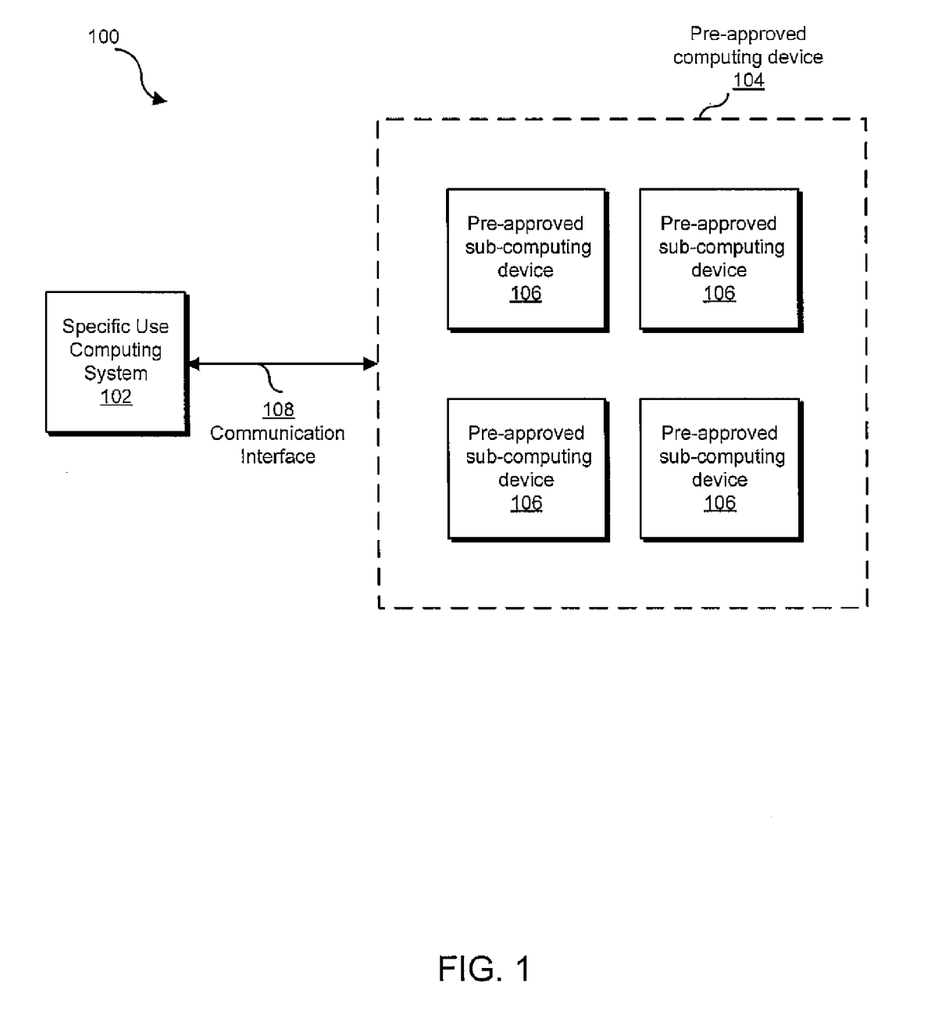
FIG. 1 is an illustration of an exemplary specific-use computing system according to at least one embodiment.

The instant disclosure relates generally to methods and systems for configuring a specific-use computing system. FIG. 1 is an illustration of an exemplary specific-use computing system 102 and a pre-approved computing device 104 for configuring the same. Specific-use computing system 102 generally represents any type or form of computing system, including any single or multi-processor computing device or system capable of executing computer-readable instructions. In certain embodiments, and as will be discussed in greater detail below in connection with FIGS. 2-5, specific-use computing system 102 may be configured so that it may only execute predetermined application programs installed on specific-use computing system 102 and pre-approved application programs received from a pre-approved computing device, such as pre-approved computing device 104.

In at least one embodiment, specific-use computing system 102 may comprise a first set of predetermined application programs and a processor limited to executing the first set of predetermined application programs. In this embodiment, the first set of predetermined application programs may be chosen by a user or by a manufacturer of specific-use computing system 102. In certain embodiments, the first set of predetermined applications may be installed initially upon manufacture of specific-use computing system 102.

Because specific-use computing system 102 is limited to executing the first set of predetermined application programs, any application program not included in the first set of predetermined application programs may be blocked from running on or being executed by specific-use computing system 102. According to certain embodiments, the first set of predetermined application programs may represent application programs that are known to be safe and/or secure.

In at least one embodiment, specific-use computing system 102 may communicate with a pre-approved computing device, such as pre-approved computing device 104, via communication interface 108. Communication interface 108 may include any type or form of infrastructure capable of facilitating communication between one or more computing systems or components of computing systems. Examples of communication interface 108 include, without limitation, a communication bus and a network interface. Communication interface 108 may either represent a portion of specific-use computing system 102 or, alternatively, a separate component from specific-use computing system 102.

Pre-approved computing device 104 generally represents any type or form of computing system, including any single or multi-processor computing device or system capable of executing computer-readable instructions. Pre-approved computing device 104 may represent a single computing system or a plurality of computing systems, such as a network of computing systems. For example, as illustrated in FIG. 1, pre-approved computing device 104 may comprise a plurality of pre-approved sub-computing devices 106. In certain embodiments, pre-approved computing device 104 may configure specific-use computing system 102 via communication interface 108.

In certain embodiments, specific-use computing system 102 may be limited to executing both the first set of predetermined application programs installed on specific-use computing system 102 and pre-approved application programs received from a pre-approved computing device, such as pre-approved computing device 104. Accordingly, if an application program has not been predetermined for inclusion in the first set of pre-approved application programs, the specific-use computing system 102 may not execute the application program. Similarly, if the application program is received by the specific-use computing system 102 from any computing device other than pre-approved computing device 104, the specific-use computing system 102 may not execute the application program.

In certain embodiments, application programs not contained within the initial first set of predetermined application programs may be received from a pre-approved computing device, such as pre-approved computing device 104, and installed for use on specific-use computing system 102. In one embodiment, specific-use computing system 102 may comprise a user interface that enables a user of specific-use computing system 102 to identify and select additional programs to be received from pre-approved computing device 104 and installed for use on specific-use computing system 102. In certain embodiments, the pre-approved application programs received from pre-approved computing device 104 may represent application programs not included in the first set of predetermined application programs installed on specific-use computing system 102. In addition, the pre-approved application programs received from the pre-approved computing device may be added after the first set of predetermined application programs have been received by and/or installed on specific-use computing system 102.

In certain embodiments, pre-approved computing device 104 may further configure specific-use computing system 102 by limiting specific-use computing system 102 to executing only a portion of the first set of predetermined application programs installed on specific-use computing system 102. For example, if the first set of predetermined application programs installed on specific-use computing system 102 comprises a first application program, a second application program, and a third application program, pre-approved computing device 104 may limit specific-use computing system 102 to executing only the first application program and the third application program.

In at least one embodiment, specific-use computing system 102 may additionally comprise a security module. This security module generally represents any type or form of hardware device or software module capable of enforcing security policies for specific-use computing system 102. For example, in one embodiment the security module may be configured to prevent specific-use computing system 102 from receiving or executing any application programs from any non-approved computing device. This security module may also be configured to prevent the creation of computer-executable instructions except by consent of the security module.

Figure 2:
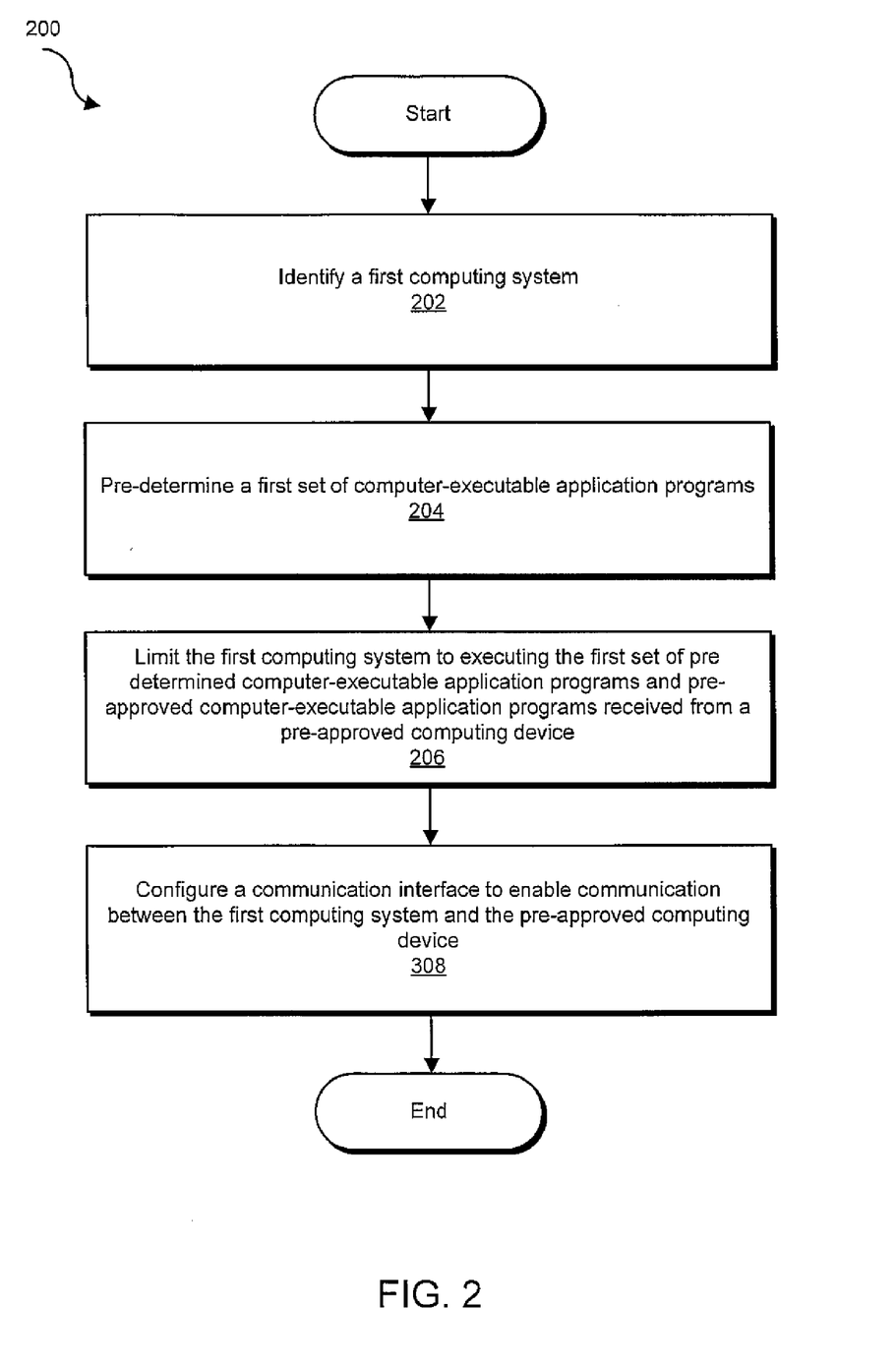
FIG. 2 is a flow diagram of an exemplary computer-implemented method for configuring a specific-use computing system according to at least one embodiment.
Figure 3A:
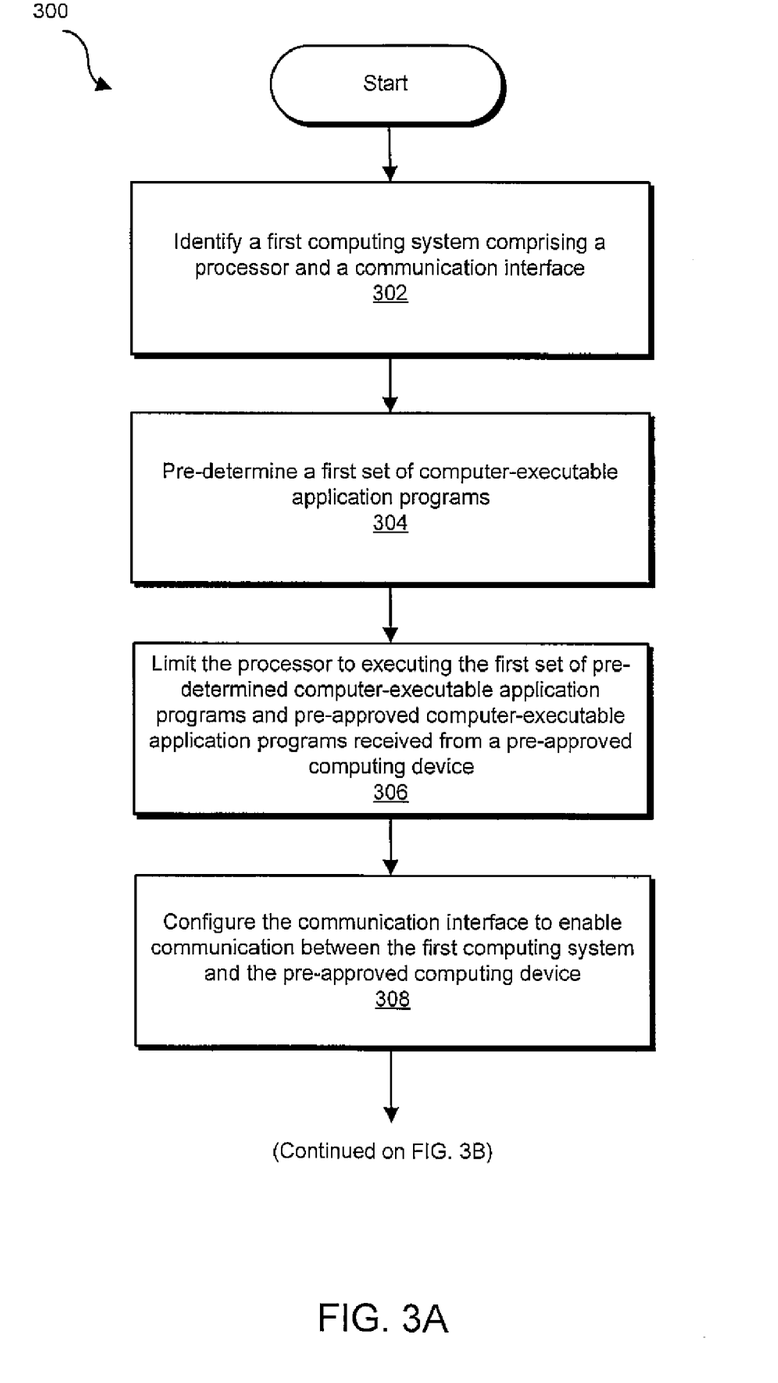
FIG. 3. is a flow diagram of an exemplary computer-implemented method for configuring a specific-use computing system according to an additional embodiment.
Figure 3B:
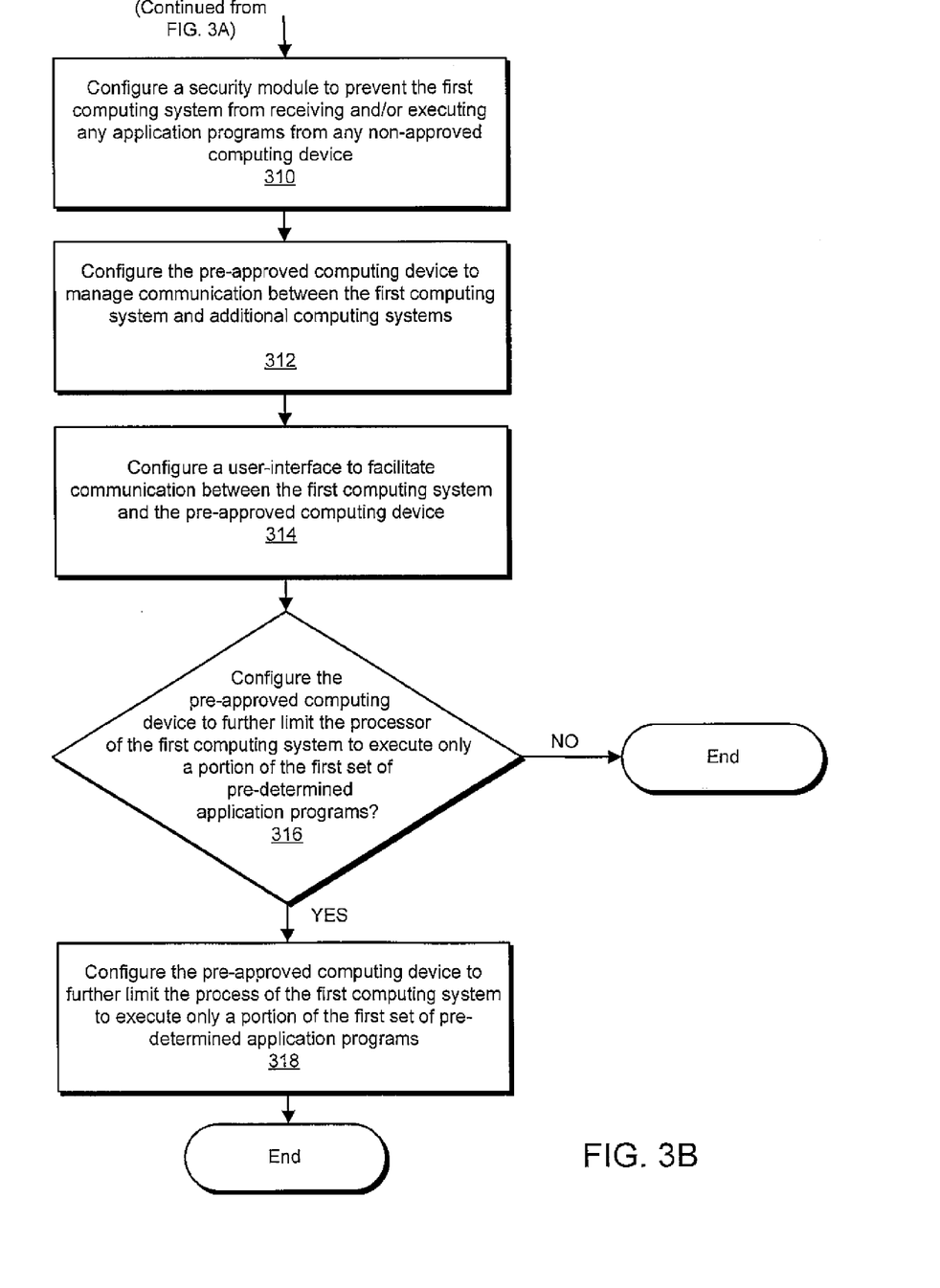

FIG. 2 is a flow diagram of an exemplary computer-implemented method for configuring specific-use computing system 102 according to at least one embodiment. As illustrated in this figure, at step 202 a first computing system, such as specific-use computing system 102, may be identified. As detailed above, in certain embodiments specific-use computing system may comprise a processor and a communication interface. The specific-use computing system 102 may be any system as described above or below or any system capable of performing the steps described herein.

At step 204, a first set of computer-executable application programs may be predetermined. This pre-determination may occur in any number of ways. For example, before the specific-use computing system 102 is operational, a user may choose a certain number of programs to be used in association with the specific-use computing system 102. Alternatively, a user may choose a certain number of programs to be used in association with the first computing system after the specific-use computing system 102 is operational.

At step 206, a processor may be limited to executing the first set of predetermined computer-executable application programs and the pre-approved computer-executable application programs received from the pre-approved computing device 104. In some embodiments, the processor may not perform any functions other than those to which the processor is specifically directed to implement.

At step 208, communication interface 108 may be configured to enable communication between the specific-use computing system 102 and the pre-approved computing device 104. This communication interface may be any form of communication infrastructure capable of facilitating communication between one or more components of a computing device, such as a communication bus and a network.

FIG. 3 is a flow diagram of an exemplary computer-implemented method for configuring a specific-use computing system according to an additional embodiment. In this embodiment, steps 302 through 308 may be identical to steps 202 through 208 described above. In addition, at step 310, a security module may be configured to prevent specific-use computing system 102 from receiving and/or executing any application programs from any non-approved computing device. This security module may be any computer-executable instruction that allows specific-use computing system 102 to function as discussed above. In some embodiments, this may give the user great comfort to know there is a finite number of application programs the processor will execute.

At step 312, pre-approved computing device 104 may manage communication between the specific-use computing system 102 and additional computing systems. In certain embodiments, this may entail limiting the ability of specific-use computing system 102 to communicate with additional devices or computing systems. For example, pre-approved computing device 104 may prevent specific-use computing system 102 from communicating with web servers known to host malicious files and software. Thus, in some embodiments, pre-approved computing device 104 may determine with which devices or systems specific-use computing system 102 may communicate.

At step 314, a user interface may facilitate communication between the specific-use computing system 102 and the pre-approved computing device 104. The user interface may be any type of interface that enables a user to communicate. For instance, the user interface may be a web-based interface. In certain embodiments, a user of specific-purpose computing system 102 may, through this user interface, request that the first set of predetermined application programs be expanded or contracted, request the ability to communicate with additional or fewer external devices, and the like.

At step 316, a user may determine whether to configure the pre-approved computing device 104 to further limit the specific-use computing system 102 to executing only a portion of the first set of predetermined application programs. For example, as detailed above, a user of specific-use computing device 102 or an operator of pre-approved device may request that one or more of the application programs contained within the first set of predetermined application programs be removed from specific-use computing system 102 or disabled. If it is determined to further limit the processor as discussed above, the pre-approved computing device 104 may be so configured. If it is determined to not further limit the processor as discussed above, the process flow of the exemplary method may then terminate.

Figure 4:
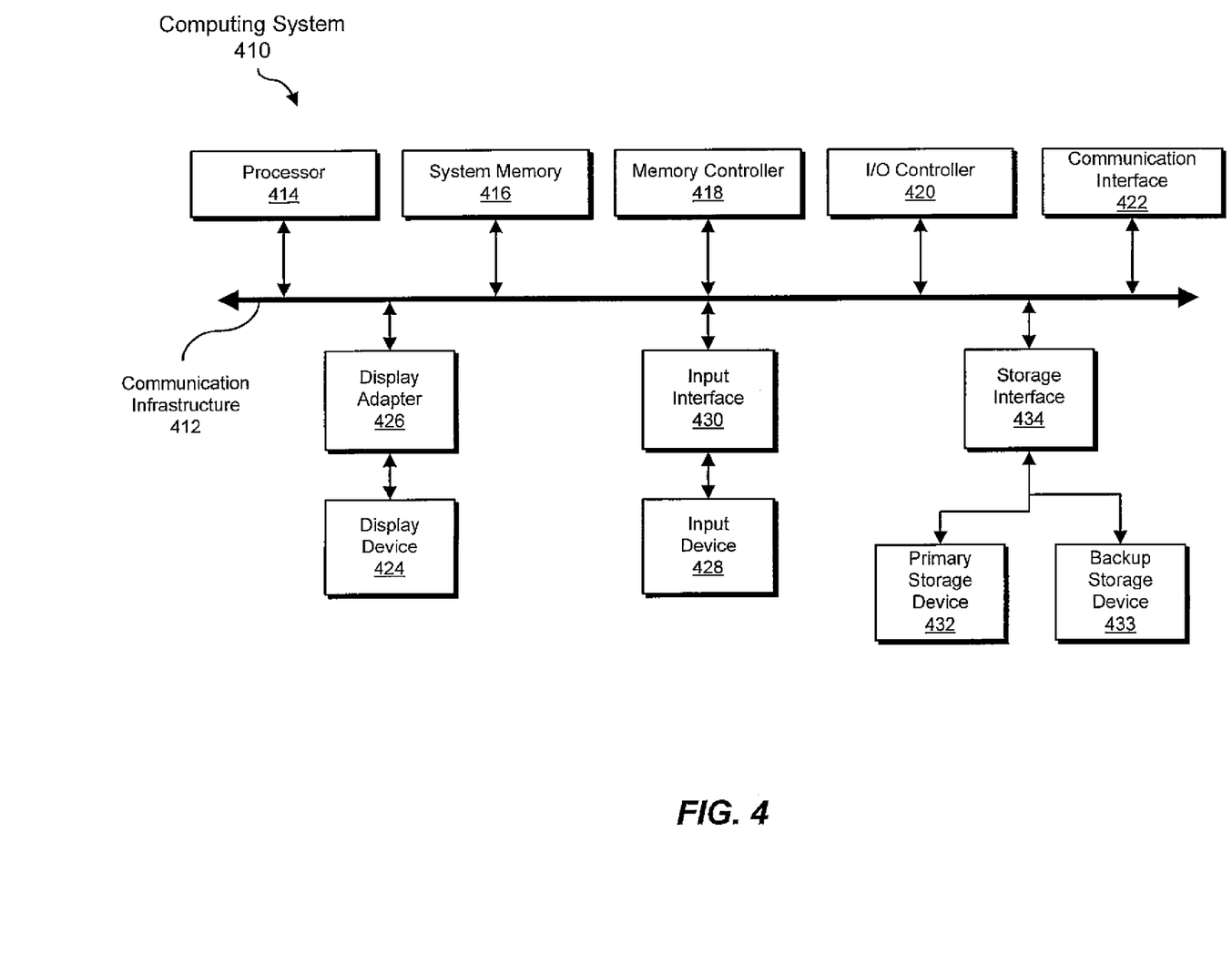
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. In certain embodiments, computing system 410 may represent a specific-use computing system (such as specific-use computing system 102 in FIG. 1) configured in the manner described herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, predetermining, limiting, configuring, and preventing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing device 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an Input/Output (I/O) controller 418, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, the pre-approved computing device 104 may control communication with processor 414 of the specific-use computing system 102. In certain embodiments, memory controller 418 may perform and/or be a means for performing, either alone or in combination with other elements, one or more of the steps or features described and/or illustrated herein, such as identifying, predetermining, limiting, configuring, and preventing.

I/O controller 420 generally represents any type or form of module capable of coordinating and/or controlling the input and output functions of a computing device. For example, in certain embodiments I/O controller may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, predetermining, limiting, configuring, and preventing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network comprising additional computing systems. In certain embodiments communication interface 422 may facilitate communication with the first computing system and the pre-approved computing device. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network (such as a BLUETOOTH network), a telephone or cable network, a cellular telephone connection, a satellite data connection, or any other suitable connection. In at least one embodiment, the user interface may facilitate communication using any of the above-mentioned connections.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, predetermining, limiting, configuring, and preventing steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, predetermining, limiting, configuring, and preventing steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, the exemplary file systems disclosed herein may be stored on primary storage device 432, while the exemplary file-system backups disclosed herein may be stored on backup storage device 433. Storage devices 432 and 433 may also be used, for example, to perform and/or be a means for performing, either alone or in combination with other elements, one or more of the identifying, predetermining, limiting, configuring, and preventing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments descried and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
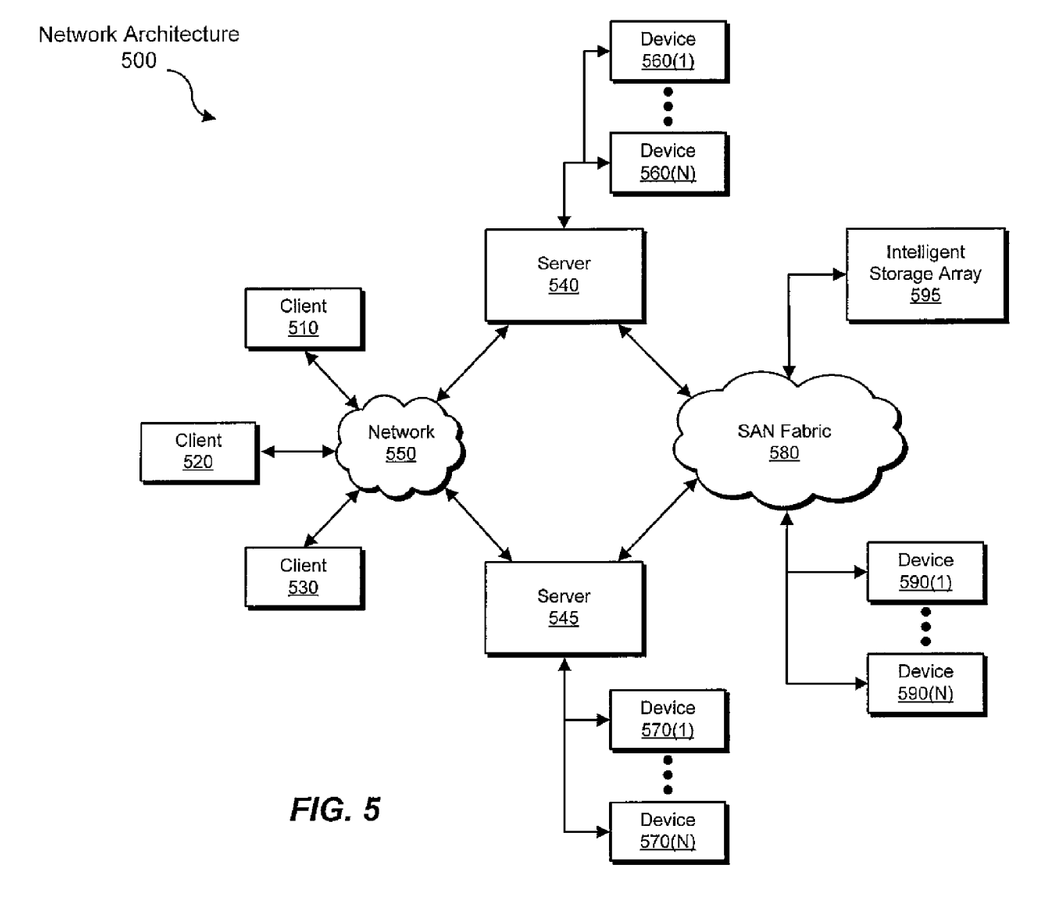
FIG. 5 is a block diagram of an exemplary computing system capable of implementing one or more of the embodiments described and/or illustrated herein.

FIG. 5 is a block diagram of an exemplary network architecture 500 in which one or more of the exemplary embodiments herein may be implemented. As illustrated in this figure, client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), or the Internet. As illustrated in FIG. 5, one or more storage devices 560(1)-(N) may be directly attached to server 540. Similarly, one or more storage devices 590(1)-(N) may be directly attached to server 545. Storage devices 560(1)-(N) and storage devices 590(1)-(N) generally represent any type or form of storage device or medium capable of storing data and/or other computer-readable instructions. In certain embodiments, storage devices 560(1)-(N) and storage devices 590(1)-(N) may represent network-attached storage (NAS) devices configured to communicate with servers 540 and 545 using various protocols, such as NES, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 550, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590 (1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, predetermining, limiting, configuring, and preventing steps disclosed herein. Network architecture 500 may also be used to perform and/or be a means for performing other steps and features set forth in the instant disclosure.

For example, in certain embodiments client systems 510, 520, and 530 may represent specific-purpose computers (such as specific-purpose computer 102) configured in the manner described herein. Similarly, server 540, server 545, storage devices 560(1)-(N), storage devices 570(1)-(N), storage devices 590(1)-(N), intelligent storage array 595, or any combination thereof, may represent one or more pre-approved computing devices (such as pre-approved computing devices 104 and 106).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computing system, comprising:
    at least one set of predetermined application programs installed on the computing system by a manufacturer of the computing system;
    at least one processor that is limited to executing only:
        the set of predetermined application programs;
        pre-approved application programs received from a pre-approved computing device that is configured to manage the computing system; and
    a security module configured to prevent the computing system from receiving or executing application programs from any computing device other than the pre-approved computing device;
    wherein the processor is configured so as to be unable to execute any functions other than those specified by either the set of predetermined application programs or the pre-approved application programs received from the pre-approved computing device; and
    wherein the pre-approved application programs comprise application programs not included in the set of predetermined application programs installed on the computing system by the manufacturer of the computing system.

2. The computing system of claim 1, further comprising a communication interface configured to enable communication between the computing system and the pre-approved computing device.

3. The computing system of claim 1, wherein the pre-approved computing device comprises a plurality of computing devices.

4. The computing system of claim 1, wherein the security module is further configured to prevent the creation of computer-executable instructions except by consent of the security module.

5. The computing system of claim 1, wherein the computing system comprises a plurality of computing systems.

6. The computing system of claim 1, wherein the pre-approved application programs comprise at least one of:
    a software update;
    a hardware update;
    an application update;
    a registry key update;
    an operating system update; and
    a device driver update.

7. The computing system of claim 1, wherein the pre-approved computing device manages communication between the computing system and additional computing systems.

8. The computing system of claim 1, further comprising a user-interface configured to enable a user of the computing system to identify and select pre-approved application programs that are to be received from the pre-approved computing device and installed on the computing system.

9. The computing system of claim 1, wherein the pre-approved computing device is configured to further limit the processor of the computing system to executing only a portion of the set of predetermined application programs.

10. A method for configuring a computing system, comprising:
    identifying a computing system, the computing system comprising at least one processor;
    predetermining at least one set of computer-executable application programs;
    limiting the processor of the computing system to executing only:
        the set of predetermined computer-executable application programs;
        pre-approved computer-executable application programs received from a pre-approved computing device that is configured to manage the computing system; and
    configuring a security module to prevent the computing system from receiving or executing application programs from any computing device other than the pre-approved computing device;

configuring the processor so that the processor is unable to execute any functions other than those specified by either the set of predetermined computer-executable application programs or the pre-approved computer-executable application programs received from the pre-approved computing device;

wherein the pre-approved computer-executable application programs comprise application programs not included in the set of predetermined computer-executable application programs installed on the computing system by a manufacturer of the computing system.

11. The method of claim 10, further comprising configuring a communication interface to enable communication between the computing system and the pre-approved computing device.

12. The method of claim 10, wherein the pre-approved computing device comprises a plurality of computing devices.

13. The method claim 10, wherein the security module is further configured to prevent the creation of computer-executable instructions except by consent of the security module.

14. The method of claim 10, wherein the pre-approved computer-executable application programs comprise at least one of:
a software update;
a hardware update;
an application update;
a registry key update;
an operating system update; and
a device driver update.

15. The method of claim 10, further comprising configuring the pre-approved computing device to manage communication between the computing system and additional computing systems.

16. The method of claim 10, further comprising configuring a user-interface to enable a user of the computing system to identify and select pre-approved computer-executable application programs that are to be received from the pre-approved computing device and installed on the computing system.

17. The method of claim 10, further comprising configuring, using the pre-approved computing device, the processor of the computing system to execute only a portion of the set of predetermined computer-executable application programs.

* * * * *